US012786608B2

(12) United States Patent
Guo et al.

(10) Patent No.: US 12,786,608 B2
(45) Date of Patent: Nov. 3, 2026

(54) EARMUFF AND HEAD-MOUNTED HEADPHONES

(71) Applicant: GOERTEK INC., Shandong (CN)

(72) Inventors: Rui Guo, Shandong (CN); Huaying Feng, Shandong (CN); Cheng Zhao, Shandong (CN)

(73) Assignee: GOERTEK INC., Shandong (CN)

( * ) Notice: Subject to any disclaimer, the term of this patent is extended or adjusted under 35 U.S.C. 154(b) by 363 days.

(21) Appl. No.: 18/549,578

(22) PCT Filed: Jun. 29, 2021

(86) PCT No.: PCT/CN2021/103023
§ 371 (c)(1),
(2) Date: Sep. 7, 2023

(87) PCT Pub. No.: WO2022/188304
PCT Pub. Date: Sep. 15, 2022

(65) Prior Publication Data

US 2024/0155280 A1 May 9, 2024

(30) Foreign Application Priority Data

Mar. 9, 2021 (CN) ......................... 202110257892.3

(51) Int. Cl.
*H04R 1/10* (2026.01)
*H04R 1/08* (2006.01)

(52) U.S. Cl.
CPC .......... *H04R 1/1008* (2013.01); *H04R 1/083* (2013.01)

(58) Field of Classification Search
CPC .... H04R 1/1008; H04R 1/083; A42B 1/0188; A42B 1/0186; A61F 11/06
(Continued)

(56) References Cited

U.S. PATENT DOCUMENTS 3,073,410 A * 1/1963 Gongoll .................. A61F 11/14 181/129
10,469,939 B1 11/2019 Tikander
(Continued)

FOREIGN PATENT DOCUMENTS

CN 2035038 U 3/1989
CN 2161563 Y 4/1994
(Continued)

*Primary Examiner* — Carolyn R Edwards
*Assistant Examiner* — Dylan Maguire Neece
(74) *Attorney, Agent, or Firm* — Ingrassia Fisher & Lorenz, LLP

(57) ABSTRACT

An earmuff and head-mounted headphones are disclosed. The earmuff comprises earmuff leather and earmuff sponge. The earmuff further comprises an airbag base and an earmuff airbag made of a soft rubber material. The earmuff airbag comprises at least one hollow enclosed airbag. The airbag base is disposed at a bottom of the earmuff airbag to enhance a support force of the bottom of the earmuff airbag. The earmuff sponge is wrapped on an outer surface of the earmuff airbag. The earmuff leather is wrapped on an outer surface of the earmuff sponge. The earmuff according to the present disclosure increases the conducting media of noise by adding the earmuff airbag. The noise will be continuously reduced after passing through different media, thereby enhancing the passive noise reduction ability of the earmuff, and improving the user experience.

10 Claims, 11 Drawing Sheets

(a) (b)

(58) Field of Classification Search
USPC .................................................... 381/370, 72
See application file for complete search history.

(56) References Cited

U.S. PATENT DOCUMENTS

| | | | | |
|---|---|---|---|---|
| 2013/0061376 | A1 | 3/2013 | Halfaker | |
| 2018/0139525 | A1 * | 5/2018 | Chen ........................ | H04R 1/10 |
| 2018/0255387 | A1 * | 9/2018 | Chen .................... | H04R 1/1016 |

FOREIGN PATENT DOCUMENTS

| | | | | | |
|---|---|---|---|---|---|
| CN | 2870792 | Y | | 2/2007 | |
| CN | 201147414 | Y | | 11/2008 | |
| CN | 203057435 | U | | 7/2013 | |
| CN | 203794544 | U | | 8/2014 | |
| CN | 204272345 | U | | 4/2015 | |
| CN | 108269564 | A | | 7/2018 | |
| CN | 210168193 | U | * | 3/2020 | |
| CN | 111200771 | A | * | 5/2020 | ........... H04R 1/1083 |
| CN | 211296928 | U | | 8/2020 | |
| CN | 211433683 | U | | 9/2020 | |
| CN | 212086432 | U | | 12/2020 | |
| CN | 112954533 | A | | 6/2021 | |
| CN | 214544720 | U | | 10/2021 | |
| WO | 2015164889 | A1 | | 10/2015 | |

* cited by examiner

EARMUFF AND HEAD-MOUNTED HEADPHONES

CROSS-REFERENCE TO RELATED APPLICATIONS

This Application is a U.S. National-Stage entry under 35 U.S.C. § 371 based on International Application No. PCT/CN2021/103023, filed Jun. 29, 2021 which was published under PCT Article 21(2) and which claims priority to Chinese Application No. 202110257892.3, filed Mar. 9, 2021, which are all hereby incorporated herein in their entirety by reference.

TECHNICAL FIELD

This application pertains to the technical field of headphones, in particular to an earmuff and head-mounted headphones.

BACKGROUND

With the development of science and technology, head-mounted headphones are increasingly widely used, and users' requirements for head-mounted headphones are also increasing. FIG. 1 shows a cross-sectional view of a conventional earmuff. As shown in FIG. 1, the conventional earmuff comprises earmuff sponge 2' and earmuff leather 3'. When external noise enters the interior of the earmuff, it only needs to pass through the earmuff leather, 3' and the earmuff sponge 2'. Then, it passes through the earmuff sponge 2', and then passes through the earmuff leather 3', and finally enters the interior of the earmuff and thus enters the human ear. Since external noise only passes through two types of conducting media, i.e., the earmuff leather 3' and the earmuff sponge 2', it cannot effectively reduce the noise, and the passive noise reduction ability of headphones is poor. In addition, other objects, desirable features and characteristics will become apparent from the subsequent summary and detailed description, and the appended claims, taken in conjunction with the accompanying drawings and this background.

SUMMARY

In view of the above problems, the present disclosure proposes an earmuff and head-mounted headphones to overcome or at least partially solve the above problems.

According to an aspect of the present disclosure, an earmuff is provided, which comprises earmuff leather and earmuff sponge. The earmuff further comprises an airbag base and an earmuff airbag made of a soft rubber material. The earmuff airbag comprises at least one hollow enclosed airbag. The airbag base is disposed at a bottom of the earmuff airbag to enhance a support force of the bottom of the earmuff airbag. The earmuff sponge is wrapped on an outer surface of the earmuff airbag. The earmuff leather is wrapped on an outer surface of the earmuff sponge.

Optionally, the earmuff airbag comprises a multi-segment enclosed airbag or a single segment enclosed airbag;

segments of the multi-segment enclosed airbag are communicated with each other or independent of each other;

in the single segment enclosed airbag, there is not an airbag partition, or there is at least one airbag partition.

Optionally, the earmuff airbag is formed through split assembly;

the earmuff airbag comprises an upper part and a lower part, the upper part of the earmuff airbag is provided with a skeleton structure, a bottom of the upper part of the earmuff airbag is provided with a slot, an upper surface of the lower part of the earmuff airbag is provided with a boss, and the slot on the bottom of the upper part of the earmuff airbag and the boss on the upper surface of the lower part of the earmuff airbag are engaged and assembled to form the earmuff airbag.

Optionally, when the earmuff airbag is the single segment enclosed airbag or the multi-segment enclosed airbag in which the segments are communicated with each other, the earmuff airbag is formed through integral assembly;

the earmuff airbag is initially in a hollow strip shape, with one end provided with a depression and the other end provided with a protrusion, and the two ends are abutted and assembled and then adhesively bonded to form the earmuff airbag.

Optionally, when the earmuff airbag is formed through integral assembly, multiple reinforcing ribs are provided on an inner wall of the earmuff airbag to enhance support force of an inner wall of the earmuff airbag.

Optionally, multiple reinforcing rib engaging notches are provided on a projection formed on an inner side of the airbag base, and the multiple reinforcing ribs and multiple reinforcing rib engaging notches are mutually clamped with each other to install the airbag base at the bottom of the earmuff airbag.

Optionally, the multiple reinforcing ribs are evenly distributed on the inner wall of the earmuff airbag, the multiple reinforcing rib engaging notches are evenly distributed on the airbag base, and the multiple reinforcing ribs and the multiple reinforcing rib engaging notches are matched in quantity and position.

Optionally, when the earmuff airbag is formed through split assembly, an installation groove for the lower part of the earmuff airbag is provided on an inner side of the airbag base, and the lower part of the earmuff airbag is assembled and adhesively bonded into the installation groove to install the airbag base at the bottom of the earmuff airbag.

Optionally, the airbag base is also used to accommodate and tighten the earmuff sponge to reduce a maximum diameter of a root part of the earmuff.

According to another aspect of the present disclosure, head-mounted headphones are provided, which use the above earmuffs.

It can be seen from the above that, the earmuff according to the present disclosure increases the conducting media of noise by adding the earmuff airbag. The noise will be continuously reduced after passing through different media, thereby enhancing the passive noise reduction ability of the earmuff, and improving the user experience. Moreover, the earmuff airbag comprises at least one hollow enclosed airbag, which provides a support force to the earmuff and can replace conventional sponge support for the earmuff. The earmuff further comprises the airbag base to enhance the support force of the bottom of the earmuff airbag. The head-mounted headphones using the above earmuff have better noise reduction effect and earmuff support effect.

The above is only an overview of the technical solutions of the present disclosure. In order to better understand the technical means of the present disclosure so that it can be implemented according to the contents of the description, and in order to make the above and other objects, features and advantages of the present disclosure more obvious and easier to understand, the specific embodiments of the present disclosure are given below.

BRIEF DESCRIPTION OF DRAWINGS

The present invention will hereinafter be described in conjunction with the following drawing figures, wherein like numerals denote like elements, and.

Figure 1:
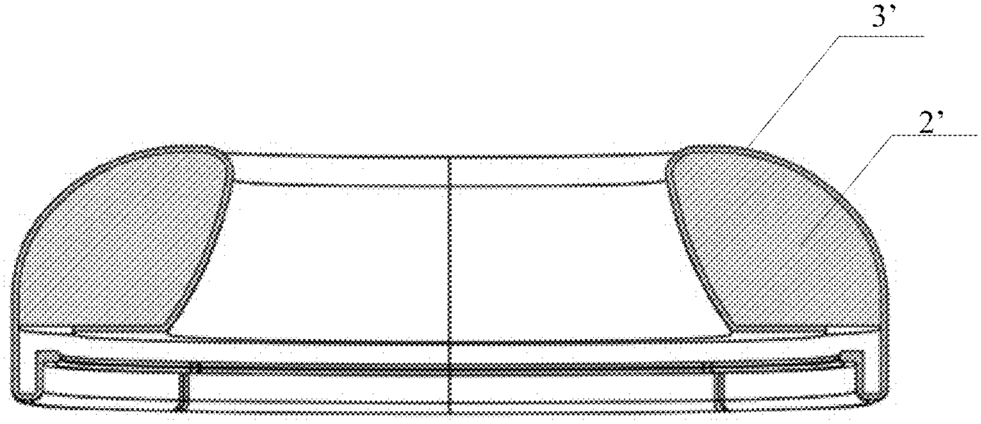
FIG. 1 shows a cross-sectional view of a conventional earmuff.

In the drawings: 1, earmuff airbag; 1-1, airbag wall thickness; 1-2, airbag internal space; 1-3, airbag partition; 1-4, airbag spacing; 1-5, depression of airbag; 1-6, protrusion of airbag; 1-7, reinforcing rib; 1-8, upper part of earmuff airbag; 1-8-1, slot; 1-9, lower part of earmuff airbag; 1-9-1, boss; 2, 2' earmuff sponge; 3, 3', earmuff leather, 4, airbag base, 4-1, reinforcing rib engaging notch; 4-2, outer flat flange; 4-3, installation groove; 5, portion representing difference in contraction space.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

In the description of the present disclosure, it should be noted that orientation or positional relationship indicated by the terms "center", "upper", "lower", "left", "right", "vertical", "horizontal", "inside", "outside", etc. are orientation or positional relationship based on the drawings, which are merely for convenience of describing the present disclosure and simplifying the description, rather than indicating or implying that the device or element referred to must have a specific orientation, or must be constructed and operated with a specific orientation, they should not be construed as limiting the present disclosure. In addition, the terms "first," "second," and "third" are merely for convenience of describing the present disclosure and cannot be understood as indicating or implying relative importance.

In the description of the present disclosure, it should be noted that unless otherwise expressly specified and defined, the terms "installed", "connected" and "fixed" should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

First Embodiment

Figure 2:
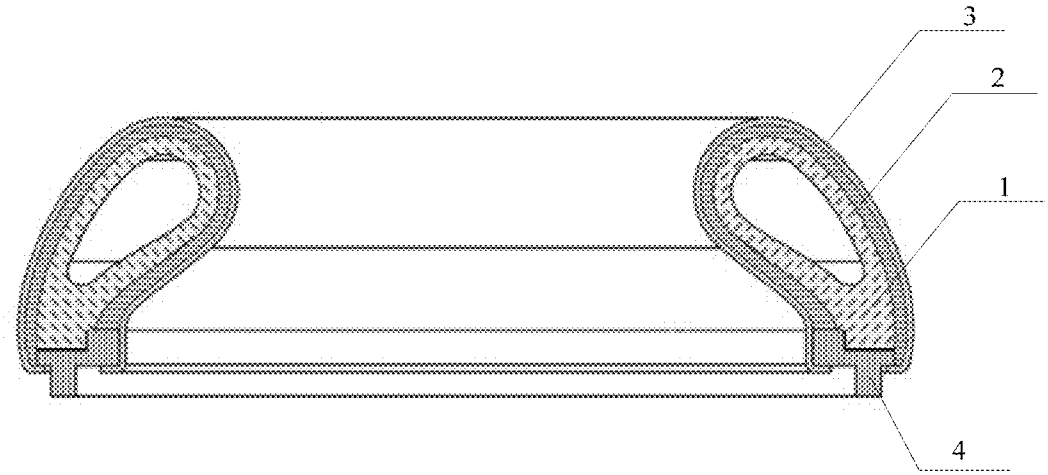
FIG. 2 shows a cross-sectional view of an earmuff according to an embodiment of the present disclosure.

FIG. 2 shows a cross-sectional view of an earmuff according to an embodiment of the present disclosure. As shown in FIG. 2, the earmuff of the present disclosure comprises an earmuff airbag 1, earmuff sponge 2, earmuff leather 3, and an airbag base 4. The airbag base 4 is disposed at the bottom of the earmuff airbag 1 to enhance the support force of the bottom of the earmuff airbag. The earmuff sponge 2 is wrapped on the outer surface of the earmuff airbag 1. The earmuff leather 3 is wrapped on the outer surface of the earmuff sponge 2. The earmuff airbag 1 comprises at least one hollow enclosed airbag and has a certain support force. Moreover, the earmuff airbag 1 is made of a soft rubber material, thereby ensuring the overall softness of the earmuff, and improving the user's wearing experience. The material of the airbag base 4 is not limited, but hard materials are preferred, since they can ensure the overall support force of the earmuff.

The soft rubber material refers to a soft material having a certain degree of ductility and flexibility, including but not limited to, silicone, rubber, soft polyvinyl chloride (PVC), ethylene vinyl acetate copolymer (EVA), polyolefin thermoplastic elastomer (POE), thermoplastic elastomer (TPE), polypropylene (PP), etc.

When external noise enters the interior of earmuff, it needs to pass through the earmuff leather 3 and earmuff sponge 2, and then enter the earmuff airbag 1. As the earmuff airbag 1 is a hollow enclosed airbag, the noise needs to pass through the earmuff airbag 1, earmuff sponge 2, and earmuff leather 3 so as to enter the interior of earmuff and thus enter the human ear. Compared with the conventional earmuff in which external noise only passes through two media, i.e., the earmuff leather 3' and earmuff sponge 2', the earmuff according to the present disclosure increases the conducting media of noise by adding the earmuff airbag 1. Thus, the noise will be continuously reduced after passing through different media, thereby enhancing the passive noise reduction ability of the earmuff, and improving the user experience. Moreover, the earmuff airbag 1 comprises at least one hollow enclosed airbag, which provides stronger support for the earmuff than the sponge material and can replace the conventional sponge support for the earmuff.

In sum, the earmuff according to the present disclosure has better noise reduction and support effects by adding the hollow enclosed earmuff airbag 1.

Second Embodiment

The earmuff airbag 1 of the present disclosure may be a single segment enclosed airbag. In the single segment enclosed airbag, there is not an airbag partition, or there is at least one airbag partition.

Figure 3:
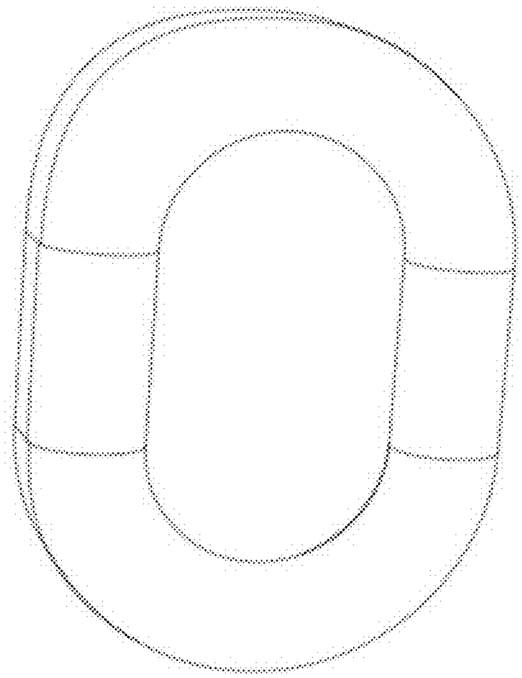
FIG. 3 shows an exterior view of a single segment enclosed airbag according to an embodiment of the present disclosure.
Figure 4:
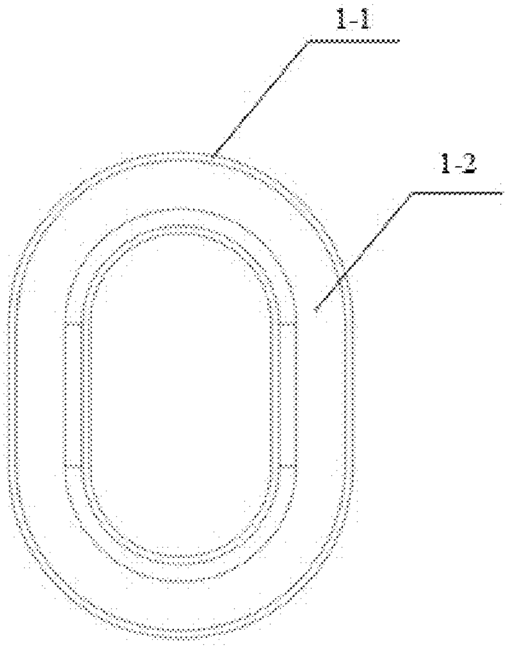
FIG. 4 shows a cross-sectional view of a single segment enclosed airbag having not an airbag partition according to an embodiment of the present disclosure.
Figure 5:
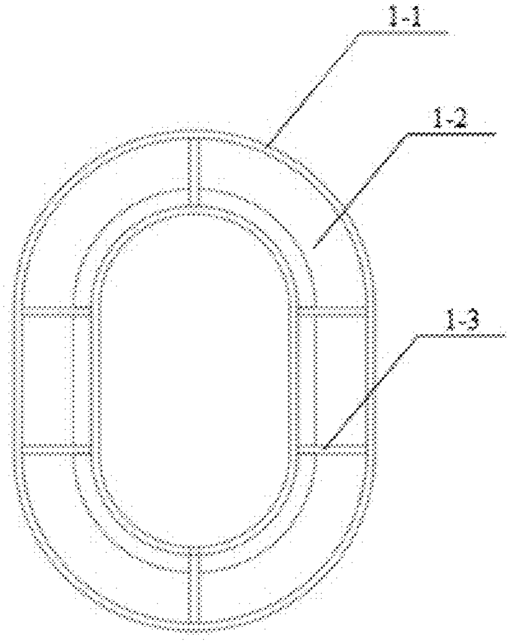
FIG. 5 shows a cross-sectional view of a single segment enclosed airbag having multiple airbag partitions according to an embodiment of the present disclosure.

FIGS. 3 to 5 schematically illustrate embodiments of the single segment enclosed airbag according to the present disclosure. FIG. 3 shows an exterior view of a single segment enclosed airbag according to an embodiment of the present disclosure. FIG. 4 shows a cross-sectional view of a single segment enclosed airbag having not an airbag partition according to an embodiment of the present disclosure. FIG. 5 shows a cross-sectional view and an overall view of a single segment enclosed airbag having multiple airbag partitions according to an embodiment of the present disclosure.

As shown in FIG. 4, the single segment enclosed airbag does not have an airbag partition, and the internal space 1-2 of the airbag is an integral enclosed space.

As shown in FIG. 5, the single segment enclosed airbag has five airbag partitions 1-3 which are independent of each other. The entire internal space 1-2 of the annular airbag is divided into several independent small airbags. By dividing the entire annular earmuff airbag into several independent small airbags, on the one hand, when a small airbag leaks, other intact small airbags can still provide a support force for the entire earmuff airbag; on the other hand, the airbag partitions 1-3 can also enhance the internal support force of the single segment enclosed airbag.

It should be noted that FIG. 5 is only an example of the single segment enclosed airbag, not a limitation of the present disclosure. Any number of airbag partitions 1-3 can be set inside the single segment enclosed airbag.

Third Embodiment

The earmuff airbag 1 of the present disclosure may be a multi-segment enclosed airbag. The segments of the multi-segment enclosed airbag are communicated with each other or independent of each other.

Figure 6:
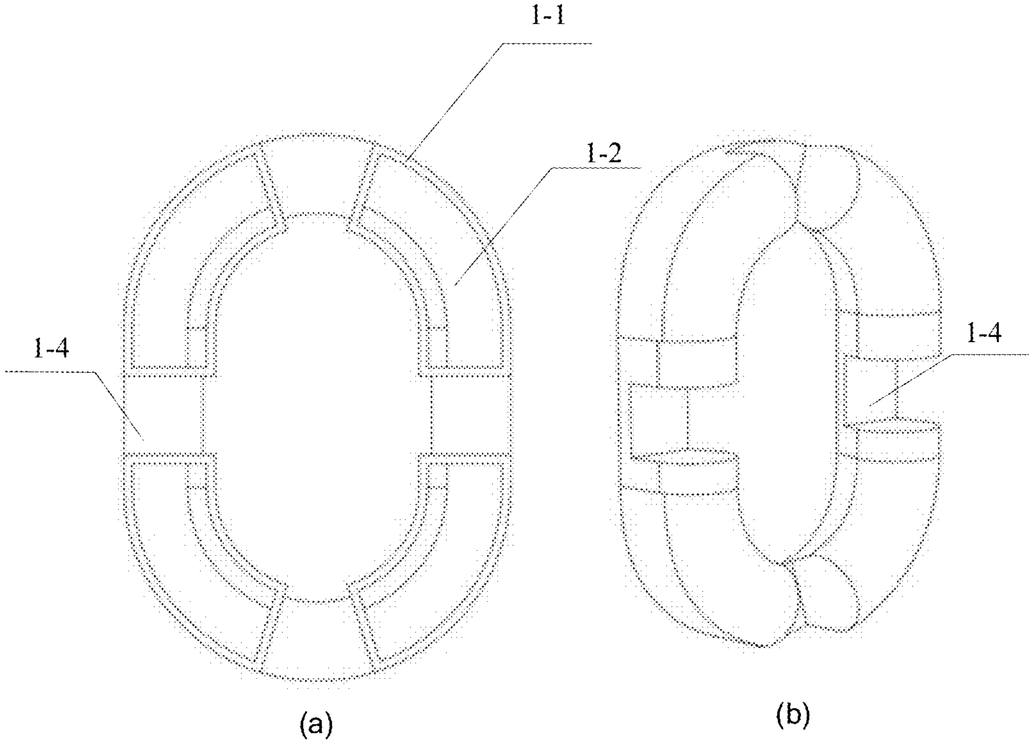
FIG. 6 shows a cross-sectional view and an exterior view of a multi-segment enclosed airbag according to an embodiment of the present disclosure.
Figure 7:
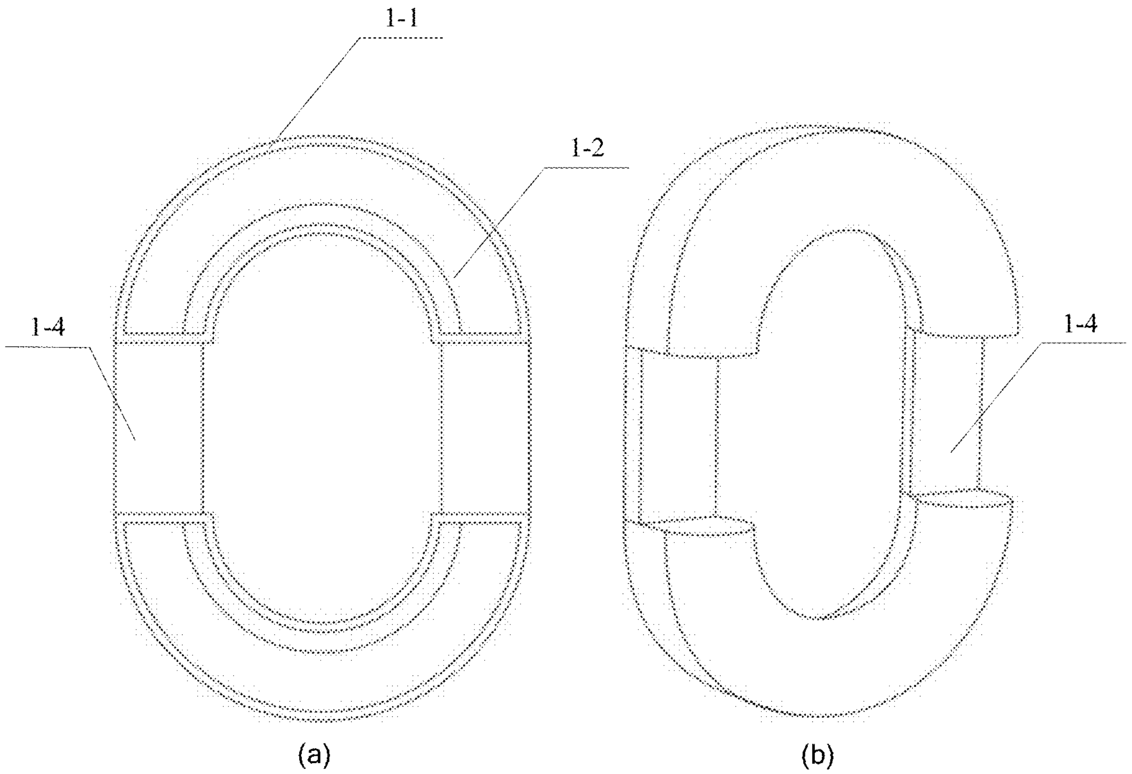
FIG. 7 shows a cross-sectional view and an exterior view of another multi-segment enclosed airbag according to an embodiment of the present disclosure.
Figure 8:
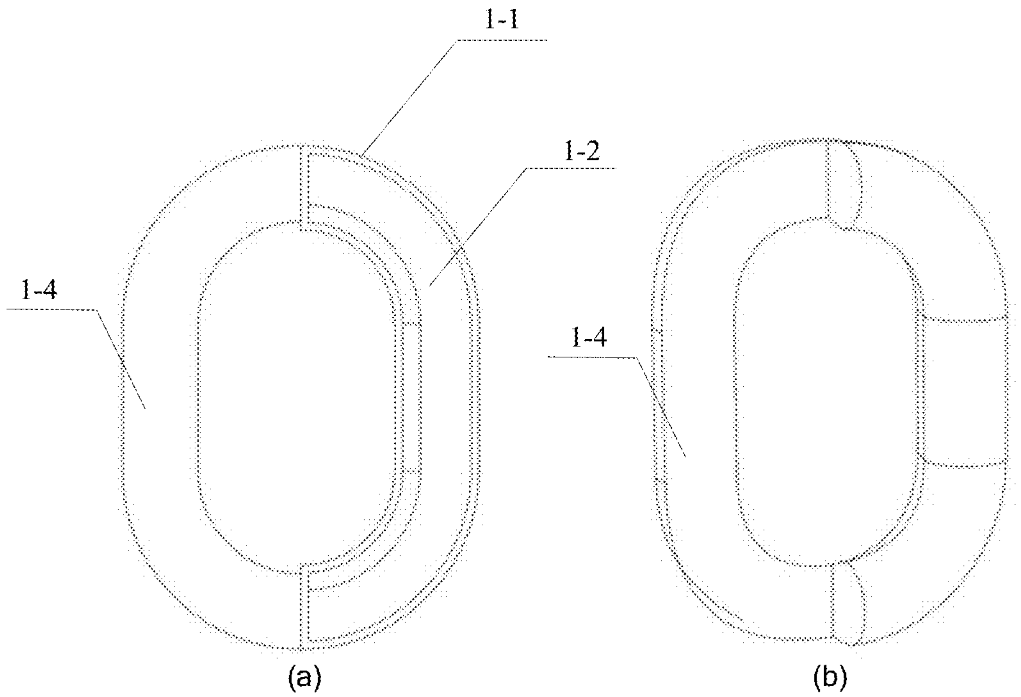
FIG. 8 shows a cross-sectional view and an exterior view of still another multi-segment enclosed airbag according to an embodiment of the present disclosure.

FIGS. 6 to 8 schematically illustrate embodiments of the multi-segment enclosed airbag of the present disclosure. FIG. 6 shows a cross-sectional view (a) and an exterior view (b) of a multi-segment enclosed airbag according to an embodiment of the present disclosure. FIG. 7 shows a cross-sectional view (a) and an exterior view (b) of another multi-segment enclosed airbag according to an embodiment of the present disclosure. FIG. 8 shows a cross-sectional view (a) and an exterior view (b) of still another multi-segment enclosed airbag according to an embodiment of the present disclosure.

As shown in FIGS. 6 to 8, the entire annular airbag may have any number (such as 4, 2, or 1, etc.) of airbag spacings 1-4. The positions and lengths of these airbag spacings 1-4 can be designed as needed. The segments of the multi-segment enclosed airbag may be communicated to each other, as shown in FIG. 6. The two ends of each segment of the airbag are communicated to the airbag spacing 1-4, so that four segments of the airbag are communicated to each other through the airbag spacings 1-4. Alternatively, the segments of the multi-segment enclosed airbag may also be independent of each other, as shown in FIGS. 7 and 8. The two ends of each segment of the airbag are closed, and each segment of the airbag is an independent airbag. The segments are connected through the airbag spacings 1-4, but they are not communicated to each other.

In this embodiment, the entire annular earmuff airbag is divided into several independent small airbags by the airbag spacings 1-4. When a small airbag leaks, other intact small airbags can still provide a support force for the entire earmuff airbag, thereby extending the service life of the earmuff.

Preferably, no matter whether the segments of the multi-segment enclosed airbag are communicated with each other or independent of each other, they are filled with a sponge at each airbag spacing 1-4. The sponge for filling may be integrally manufactured with the earmuff sponge 2 wrapped outside the earmuff airbag and then filled. Alternatively, it may be independently filled in the space of the airbag spacing 1-4. The support force between adjacent small airbags can be enhanced by filling sponges at the airbag spacings 1-4.

In this embodiment, the earmuff airbag may have various wall thicknesses 1-1 to meet different needs of users. For example, a thinner wall thickness can increase the space between the earmuff and the user's ear, and thus enhances sound quality; a thicker wall thickness can enhance the support force of the earmuff, and thus make the earmuff less prone to deformation and more durable.

It should be noted that the above is only examples of the multi-segment enclosed airbag, not a limitation of the present disclosure. The multi-stage enclosed airbags can have any number of segmented airbags in various forms.

Fourth Embodiment

When the earmuff airbag is the single segment enclosed airbag or the multi-segment enclosed airbag in which the segments are communicated with each other, the earmuff airbag 1 of the present disclosure may be formed through integral assembly.

Figure 9:
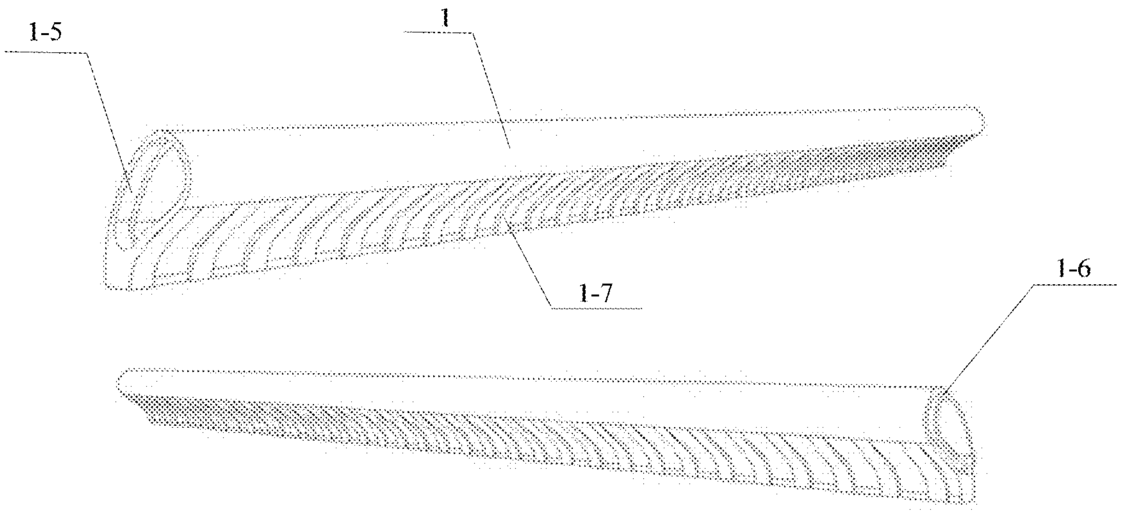
FIG. 9 shows an enlarged view of an integrally assembled earmuff airbag according to an embodiment of the present disclosure.
Figure 10:
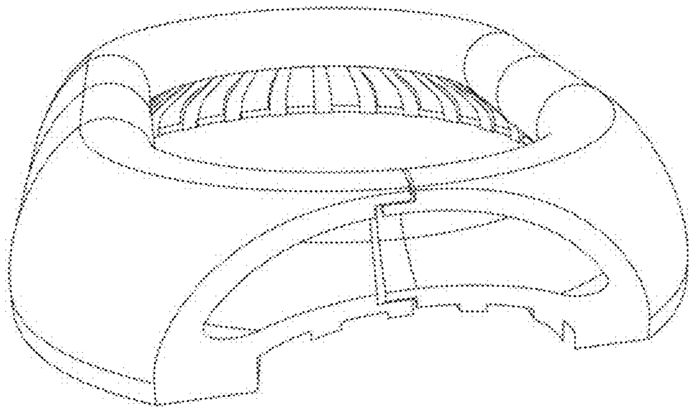
FIG. 10 shows, in the form of a cross-sectional view, the assembly effect of an integrally assembled earmuff airbag according to an embodiment of the present disclosure.
Figure 11:
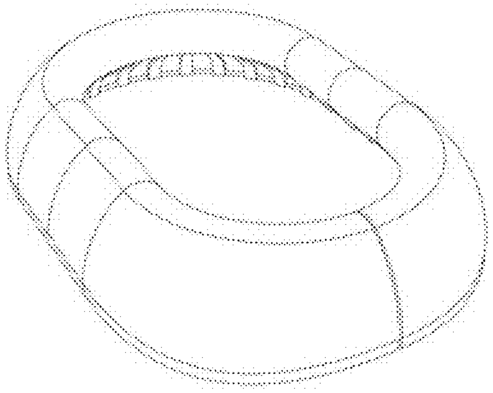
FIG. 11 shows, in the form of an exterior view, the assembly effect of an integrally assembled earmuff airbag according to an embodiment of the present disclosure.

FIGS. 9 to 11 schematically illustrate an embodiment of the integral assembly of the earmuff airbag of the present disclosure. FIG. 9 shows an enlarged view of an integrally assembled earmuff airbag according to an embodiment of the present disclosure. FIG. 10 shows, in the form of a cross-sectional view, the assembly effect of an integrally assembled earmuff airbag according to an embodiment of the present disclosure. FIG. 11 shows, in the form of an exterior view, the assembly effect of an integrally assembled earmuff airbag according to an embodiment of the present disclosure;

As shown in FIG. 9, the earmuff airbag 1 is initially in a hollow strip shape, with one end provided with a depression 1-5 and the other end provided with a protrusion 1-6, and the two ends are abutted and assembled and then adhesively bonded to form the enclosed earmuff airbag 1. The assembly effect is shown in FIGS. 10 and 11.

Figure 12:
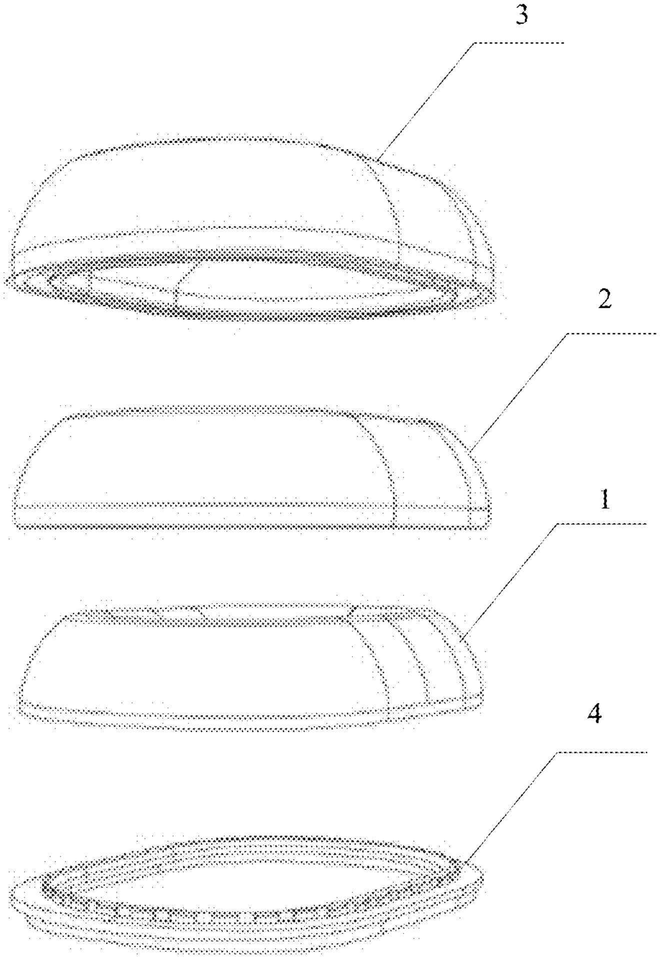
FIG. 12 shows an exploded view of an earmuff according to an embodiment of the present disclosure.
Figure 13:
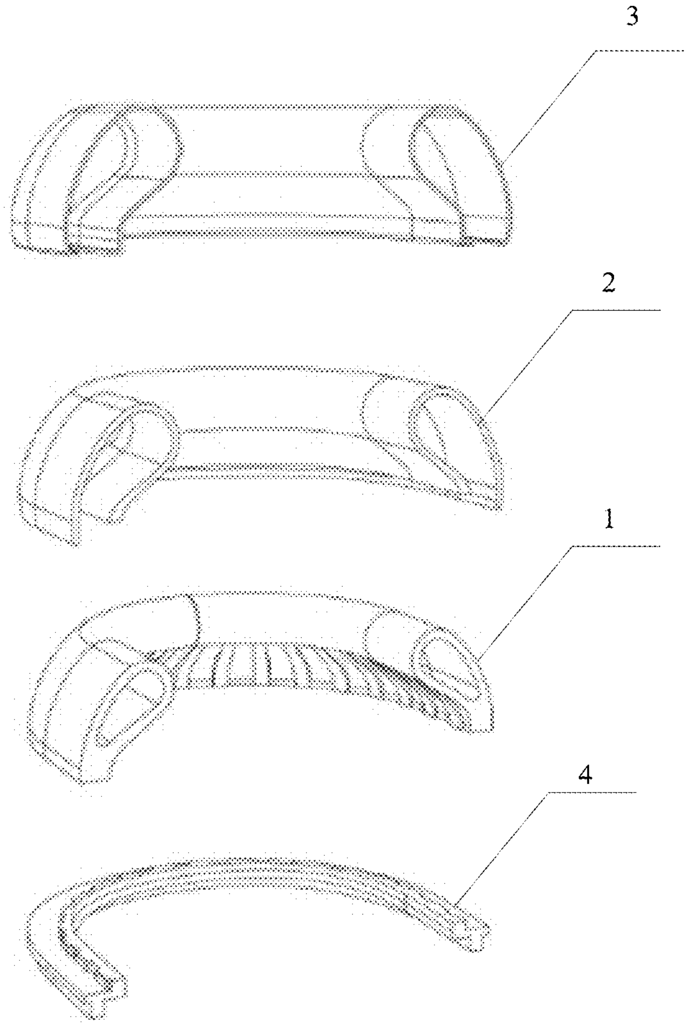
FIG. 13 shows an exploded cross-sectional view of the earmuff shown in FIG. 12.

FIG. 12 shows an exploded view of an earmuff according to an embodiment of the present disclosure. FIG. 13 shows an exploded cross-sectional view of the earmuff shown in FIG. 12. As shown in FIGS. 12 and 13, the airbag base 4 is disposed at the bottom of the earmuff airbag 1 to enhance the support force of the bottom of the earmuff airbag 1.

Preferably, as shown in FIG. 9, multiple reinforcing ribs 1-7 are provided on an inner wall of the earmuff airbag 1. The multiple reinforcing ribs 1-7 are evenly distributed on the inner wall of earmuff airbag 1 to enhance the support force of the inner wall of earmuff airbag 1.

Figure 14:
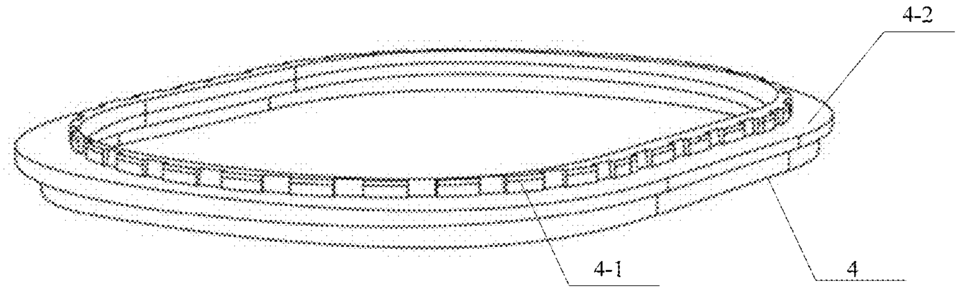
FIG. 14 shows a schematic view of an airbag base according to an embodiment of the present disclosure.

FIG. 14 shows a schematic view of the airbag base according to an embodiment of the present disclosure. In the case of the integrally assembled earmuff airbag, as shown in FIG. 14, multiple reinforcing rib engaging notches 4-1 are provided on a projection formed on the inner side of the airbag base 4. The multiple reinforcing ribs 1-7 and the multiple reinforcing rib engaging notches 4-1 are mutually clamped with each other to install the airbag base 4 at the bottom of the earmuff airbag 1, so as to enhance the support force of the bottom of the earmuff airbag 1.

Preferably, the multiple reinforcing ribs 1-7 are evenly distributed on the inner wall of the earmuff airbag 1, the multiple reinforcing rib engaging notches 4-1 are evenly distributed on the airbag base 4, and the multiple reinforcing ribs 1-7 and the multiple reinforcing rib engaging notches 4-1 are matched in quantity and position, so as to balance the support forces of the inner wall and bottom of the earmuff airbag 1.

Fifth Embodiment

The earmuff airbag 1 of the present disclosure may also be formed through split assembly.

Figure 15:
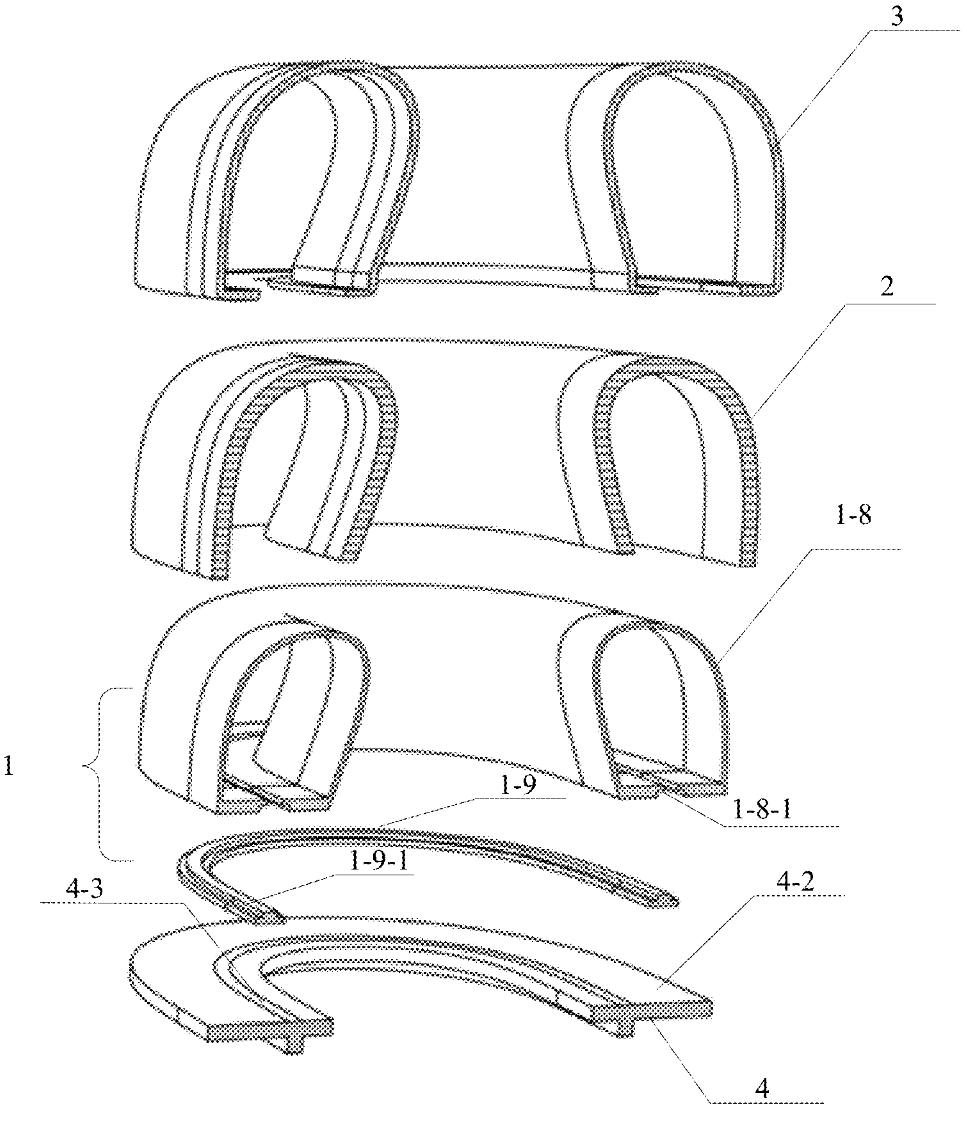
FIG. 15 shows an exploded cross-sectional view of another earmuff according to an embodiment of the present disclosure.
Figure 16:
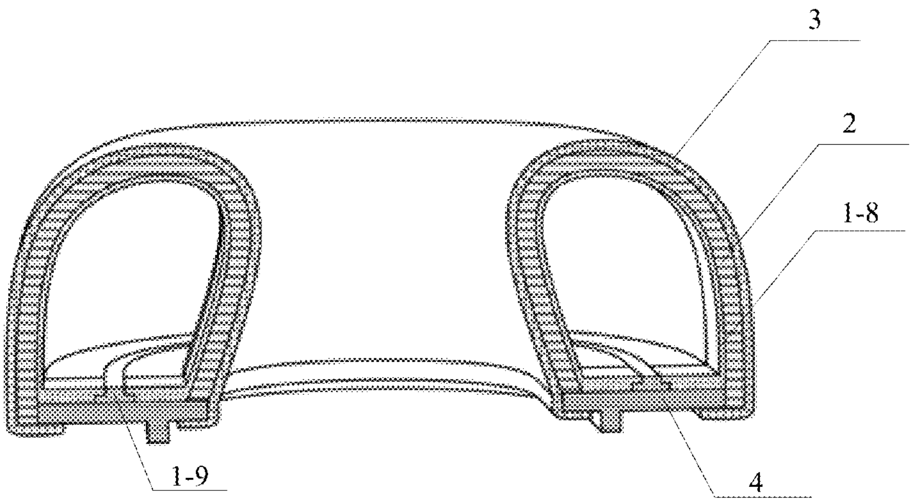
FIG. 16 shows, in the form of a cross-sectional view, the assembly effect of the earmuff shown in FIG. 15.

FIGS. 15 to 16 schematically illustrate an embodiment of a split assembled earmuff airbag according to the present disclosure. FIG. 15 shows an exploded cross-sectional view of another earmuff according to an embodiment of the present disclosure. FIG. 16 shows, in the form of a cross-sectional view, the assembly effect of the earmuff shown in FIG. 15.

As shown in FIG. 15, when the earmuff airbag 1 is formed through split assembly, it comprises an upper part 1-8 and a lower part 1-9. The upper part 1-8 of the earmuff airbag is provided with a skeleton structure, which can provide a certain support force for the earmuff airbag. The bottom of the upper part 1-8 of the earmuff airbag is provided with a slot 1-8-1, and the upper surface of the lower part 1-9 of the earmuff airbag is provided with a boss 1-9-1. The slot 1-8-1 on the bottom of the upper part of the earmuff airbag and the boss 1-9-1 on the upper surface of the lower part of the earmuff airbag are engaged and assembled to form the earmuff airbag 1. Moreover, an installation groove 4-3 for the lower part 1-9 of the earmuff airbag is provided on the inner side of the airbag base 4, the lower part 1-9 of the earmuff airbag is assembled and adhesively bonded into the installation groove 4-3, and thus the airbag base 4 is installed at the bottom of the earmuff airbag 1. The cross-sectional view of the assembly effect is shown in FIG. 16.

Sixth Embodiment

It should be noted that, when the same support force and appropriate comfort can be obtained, the width of root part and the cross-sectional area of the cross-section of the earmuff sponge 2' in the conventional earmuff are larger than those of the earmuff according to the present disclosure. Therefore, compared with the earmuff according to the present disclosure, the front sound cavity between the ear and the sound generating unit in the conventional earmuff is small and the sound quality is poor.

Figure 17:
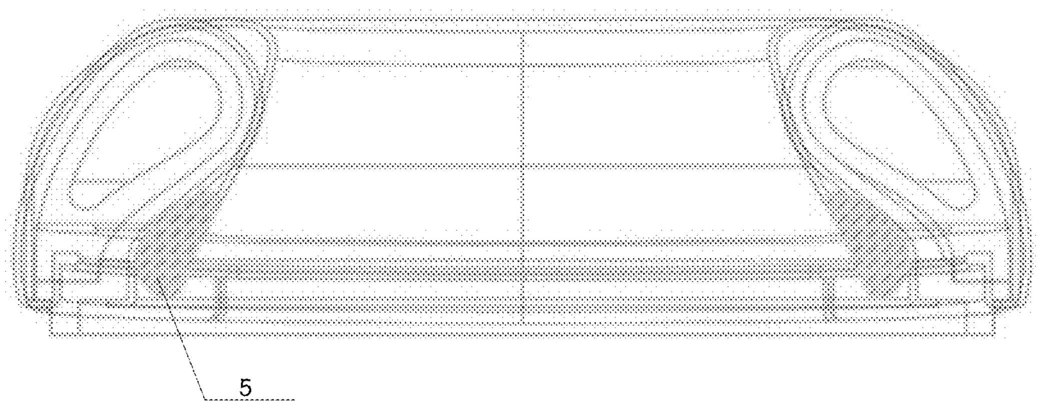
FIG. 17 shows a schematic view of the difference in contraction space between the earmuff of the present disclosure and the conventional earmuff.

Referring to FIGS. 14 to 16, the airbag base 4 is also used to accommodate and tighten the earmuff sponge, for example, to tighten the earmuff sponge 2 wrapped around the earmuff airbag 1 within an outer flat flange 4-2 so as to reduce the maximum diameter of root part of the earmuff. FIG. 17 shows a schematic view of the difference in contraction space between the earmuff according to the present disclosure and the conventional earmuff, and the shaded part indicates the portion representing difference in contraction space 5 between them. As shown in FIG. 17, when the same support force and appropriate comfort can be obtained, compared with the conventional earmuff, the earmuff according to the present disclosure can contract smaller at the root part of the earmuff, the width of root part and the cross-sectional area of the earmuff are smaller, thereby increasing the front sound cavity between the sound generating unit of the headphones and the ear, and enhancing the sound quality.

Seventh Embodiment

This embodiment discloses head-mounted headphones that use the earmuff described in the first to sixth embodiments. Compared with conventional head-mounted headphones, by using the earmuff, the head-mounted headphones according to the present disclosure enhances the passive noise reduction ability of headphones, improves the sound quality and stability, and improves the user experience.

In sum, the earmuff according to the present disclosure increases the conducting media of noise by adding the earmuff airbag. The noise will be continuously reduced after passing through different media, thereby enhancing the passive noise reduction ability of the earmuff, and improving the user experience. The earmuff airbag comprises at least one hollow enclosed airbag, which provides a more stable support force for the earmuff. Moreover, compared with the conventional earmuff, the earmuff according to the present disclosure can contract smaller at the root part of the earmuff, and can increase the space between the sound generating unit of the headphones and the ear without significant changes in the external contour size, thereby enhancing the sound quality.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. An earmuff, comprising earmuff leather and earmuff sponge, wherein the earmuff further comprises an airbag base and an earmuff airbag made of a soft rubber material, the earmuff airbag comprises at least one hollow enclosed airbag; the airbag base is disposed at a bottom of the earmuff airbag to enhance a support force of the bottom of the earmuff airbag; the airbag base is also used to accommodate and tighten the earmuff sponge to reduce a maximum diameter of a root part of the earmuff; the earmuff sponge is wrapped on an outer surface of the earmuff airbag, and the earmuff leather is wrapped on an outer surface of the earmuff sponge;

the earmuff airbag is formed through integral assembly or split assembly;

when the earmuff airbag is formed through integral assembly, multiple reinforcing ribs are provided on an inner wall of the earmuff airbag to enhance support force of an inner wall of the earmuff airbag, multiple reinforcing rib engaging notches are provided on a projection formed on an inner side of the airbag base, and the multiple reinforcing ribs and the multiple reinforcing rib engaging notches are mutually clamped with each other to install the airbag base at the bottom of the earmuff airbag, the earmuff airbag comprises a multi-segment enclosed airbag;

segments of the multi-segment enclosed airbag are communicated with each other through airbag spacings.

2. The earmuff according to claim 1, wherein when the earmuff airbag is formed through split assembly, the earmuff airbag comprises an upper part and a lower part, the upper part of the earmuff airbag is provided with a skeleton structure, a bottom of the upper part of the earmuff airbag is provided with a slot, an upper surface of the lower part of the earmuff airbag is provided with a boss, and the slot on the bottom of the upper part of the earmuff airbag and the boss on the upper surface of the lower part of the earmuff airbag are engaged and assembled to form the earmuff airbag.

3. The earmuff according to claim 1, wherein when the earmuff airbag is formed through integral assembly, the earmuff airbag is initially in a hollow strip shape, with one end provided with a depression and the other end provided with a protrusion, and the two ends are abutted and assembled and then adhesively bonded to form the earmuff airbag.

4. The earmuff according to claim 3, wherein the multiple reinforcing ribs are evenly distributed on the inner wall of the earmuff airbag, the multiple reinforcing rib engaging notches are evenly distributed on the airbag base, and the multiple reinforcing ribs and the multiple reinforcing rib engaging notches are matched in quantity and position.

5. The earmuff according to claim 2, wherein when the earmuff airbag is formed through split assembly, an installation groove for the lower part of the earmuff airbag is provided on an inner side of the airbag base, and the lower part of the earmuff airbag is assembled and adhesively bonded into the installation groove to install the airbag base at a bottom of the earmuff airbag.

6. A head-mounted headphone, comprising an earmuff, wherein the earmuff comprises earmuff leather and earmuff sponge, wherein the earmuff further comprises an airbag base and an earmuff airbag made of a soft rubber material, the earmuff airbag comprises at least one hollow enclosed airbag; the airbag base is disposed at a bottom of the earmuff airbag to enhance a support force of the bottom of the earmuff airbag; the airbag base is also used to accommodate and tighten the earmuff sponge to reduce a maximum diameter of a root part of the earmuff; the earmuff sponge is wrapped on an outer surface of the earmuff airbag, and the earmuff leather is wrapped on an outer surface of the earmuff sponge;

the earmuff airbag is formed through integral assembly or split assembly;

when the earmuff airbag is formed through integral assembly, multiple reinforcing ribs are provided on an inner wall of the earmuff airbag to enhance support force of an inner wall of the earmuff airbag, multiple reinforcing rib engaging notches are provided on a projection formed on an inner side of the airbag base, and the multiple reinforcing ribs and the multiple reinforcing rib engaging notches are mutually clamped with each other to install the airbag base at the bottom of the earmuff airbag, the earmuff airbag comprises a multi-segment enclosed airbag;

segments of the multi-segment enclosed airbag are communicated with each other.

7. The head-mounted headphone according to claim 6, wherein when the earmuff airbag is formed through split assembly, the earmuff airbag comprises an upper part and a lower part, the upper part of the earmuff airbag is provided with a skeleton structure, a bottom of the upper part of the earmuff airbag is provided with a slot, an upper surface of the lower part of the earmuff airbag is provided with a boss, and the slot on the bottom of the upper part of the earmuff airbag and the boss on the upper surface of the lower part of the earmuff airbag are engaged and assembled to form the earmuff airbag.

8. The head-mounted headphone according to claim 6, wherein when the earmuff airbag is formed through integral assembly, the earmuff airbag is initially in a hollow strip shape, with one end provided with a depression and the other end provided with a protrusion, and the two ends are abutted and assembled and then adhesively bonded to form the earmuff airbag.

9. The head-mounted headphone according to claim 8, wherein the multiple reinforcing ribs are evenly distributed on the inner wall of the earmuff airbag, the multiple reinforcing rib engaging notches are evenly distributed on the airbag base, and the multiple reinforcing ribs and the multiple reinforcing rib engaging notches are matched in quantity and position.

10. The head-mounted headphone according to claim 7, wherein when the earmuff airbag is formed through split assembly, an installation groove for the lower part of the earmuff airbag is provided on an inner side of the airbag base, and the lower part of the earmuff airbag is assembled and adhesively bonded into the installation groove to install the airbag base at a bottom of the earmuff airbag.

* * * * *